United States Patent Office 3,212,964
Patented Oct. 19, 1965

3,212,964
O,O-DIALKYL - O - ALKYLSULFOXYLETHEN-
YL - PHOSPHATES AS INSECTICIDES AND
ACARACIDES
Richard Sehring and Karl Zeile, Ingelheim (Rhine), Germany, assignors to C. H. Boehringer Sohn, Ingelheim (Rhine), Germany, a limited partnership
No Drawing. Filed Nov. 6, 1964, Ser. No. 409,604
Claims priority, application Germany, Nov. 13, 1963,
B 74,252
10 Claims. (Cl. 167—22)

This invention relates to novel O,O-dialkyl-O-alkyl-sulfoxylethenyl - phosphates, insecticidal compositions comprising said novel phosphates as active ingredients, and a method of eradicating insects and aphids with the aid of said novel phosphates.

More particularly, the present invention relates to novel O,O - dialkyl - O-alkylsulfoxylethenyl-prosphats of the formula

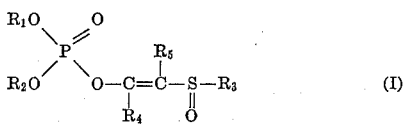

wherein $R_1$ and $R_2$ are selected from the group consisting of methyl and ethyl,
$R_3$ is alkyl of 1 to 4 carbon atoms,
$R_4$ is alkyl of 1 to 3 carbon atoms, and
$R_5$ is selected from the group consisting of hydrogen, chlorine, methyl and ethyl.

The compounds according to the present invention may be prepared by various methods involving well known chemical principles. Among these, the following have been found to be most convenient and efficient:

Method A.—By reacting a halogenated alkylsulfoxy-alkanone of the formula

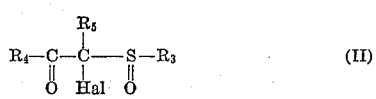

wherein Hal is chlorine or bromine and $R_3$, $R_4$ and $R_5$ have the same meanings as in Formula I, with a trialkyl-phosphite of the formula

wherein $R_1$ and $R_2$ have the same meanings as in Formula I and $R_6$ is methyl or ethyl. The reaction is carried out at a temperature between 20 and 120° C. either without or in the presence of an inert organic solvent, such as benzene, toluene, ether and the like. The alkyl halide released by the reaction may be removed from the reaction mixture by passing an inert gas, such as nitrogen, therethrough.

Method B.—By reacting a halogenated alkylmercapto-alkanone of the formula

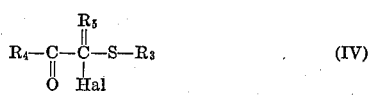

wherein $R_3$, $R_4$ and $R_5$ have the same meanings as in Formula I and Hal is chlorine or bromine, with a trialkyl-phosphite of the Formula III under the same conditions as in Method A to form an intermediate of the formula

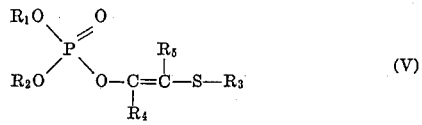

wherein $R_1$, $R_2$, $R_3$, $R_4$ and $R_5$ have the same meanings as in Formula I, and thereafter oxidizing the intermediate, preferably with hydrogen peroxide, to convert the sulfur atom into the sulfoxy group.

The following examples further illustrate the invention and will enable others skilled in the art to understand it more completely. It should be understood, however, that the invention is not limited to the particular examples given below.

EXAMPLE 1

Preparation of O,O-dimethyl-O-(1-methyl-2-ethylsulfoxyl-ethenyl-1)-phosphate by Method A 17 cc. of trimethylphosphite were slowly added dropwise to 16.9 gm. of 1-ethylsulfoxyl-1-chloro-propane-2 at 60 to 70° C. while passing nitrogen therethrough. After all of the trimethylphosphite had been added, the reaction mixture was heated for five hours on a boiling water bath; during that time the methyl chloride released by the reaction was collected to determine the completion of the reaction. Thereafter, the excess, unreacted trimethylphosphite in the reaction mixture was removed by heating the reaction mixture for half an hour on a boiling water bath in an oil pump vacuum. 18.5 gm. (76.5% of theory) of O,O - dimethyl - O-(1-methyl-2-ethylsulfoxyl-ethenyl-1)-phosphate of the formula

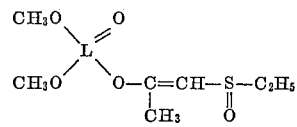

were obtained.

Analysis.—Calculated: P, 12.8%; S, 13.2%. Found: P, 12.85%; S, 13.3%.

EXAMPLE 2

Preparation of O,O-dimethyl-O-(1-methyl-2-ethyl-sulfoxyl-ethenyl-1)-phosphate by Method B 13.6 gm. of trimethylphosphite (0.11 mol) were added dropwise to 15.3 gm. of 1-ethylmercapto-1-chloro-acetone (0.1 mol). The temperature of the reaction mixture rose to about 28° C. In order to remove the methyl chloride released by the reaction, nitrogen was passed slowly through the reaction mixture. Thereafter, the reaction mixture was heated for five hours at 90–100° C., after which time the reaction had gone to completion. The excess, unreacted trimethyl phosphite was removed by distilling the reaction mixture in an aspirator vacuum, and the residue was heated for ten minutes on a boiling water bath in an oil pump vacuum. The product thus obtained was identified to be O,O-dimethyl-O-(1-methyl-2-ethyl-mercaptoethenyl-1)-phosphate.

22.6 gm. of this product were admixed with 15 cc. of water and 0.2 cc. of aqueous 50% sulfuric acid. 11.3 gm. of an aqueous 30% solution of hydrogen peroxide were slowly added dropwise to the mixture, accompanied by vigorous stirring. During the addition of the peroxide solution the temperature of the reaction mixture was allowed to rise to 40° C. and was maintained at that temperature by intermittent exterior cooling. After all of the peroxide solution had been added, the reaction mixture was stirred for two hours at 40° C. Thereafter, the unreacted hydrogen peroxide was destroyed by adding sodium bisulfite. The reaction mixture was then extracted three times with 50 ml. portions of methylene chloride. The organic phases were separated and combined, then dried, and the methylene chloride was distilled off. 22 gm. (91% of theory) of the phosphate of the formula shown in Example 1 were obtained.

*Analysis.*—P, 12.74%; S, 13.31%.

EXAMPLE 3

*Preparation of O,O-dimethyl-O-(1-methyl-2-ethyl-2-methylsulfoxyl-ethenyl-1)-phosphate by Method B*

Using the procedures described in Example 2, 1-methylmercapto-1-ethyl-1-chloro-acetone was first reacted with trimethylphosphite to form O,O-dimethyl-O-(1-methyl-2-ethyl-2-methylmercapto-ethenyl-1)-phosphate. 24 gm. of this product were then reacted with 11.3 gm. of aqueous 30% hydrogen peroxide, and the reaction mixture was worked up. 24 gm. (93.8% of theory) of O,O-dimethyl-O-(1-methyl-2-ethyl-2-methylsulfoxyl-ethenyl - 1) - phosphate of the formula

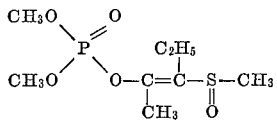

were obtained.

*Analysis.*—Calculated: P, 12.1%; S, 12.35%. Found: P, 12.35%; S, 12.3%.

EXAMPLE 4

*Preparation of O,O-dimethyl-O-(1-methyl-2-ethyl-2-methylsulfoxyl-ethenyl-1)-phosphate by Method A*

Using a procedure analogous to that described in Example 1, 18.3 gm. of 3-methylsulfoxyl-3-chloropentanone-2 were reacted with 17 cc. of trimethylphosphite, and the reaction mixture was worked up. 21.5 gm. (84% of theory) of the compound of the formula shown in Example 3 were obtained.

*Analysis.*—P, 12.4%; S, 12.2%.

EXAMPLE 5

*Preparation of O,O-dimethyl-O-(1-methyl-2-n-butyl-sulfoxyl-ethenyl-1)-phosphate by Method B*

Using a procedure analogous to that described in Example 2, 25.4 gm. of O,O-dimethyl-O-(1-methyl-2-n-butylmercapto-ethenyl-1)-phosphate were reacted with 11.3 gm. of aqueous 30% hydrogen peroxide, and the reaction mixture was worked up. 23 gm. (85.2% of theory) of the compound of the formula

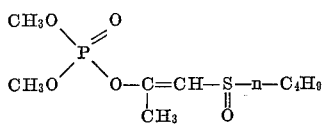

were obtained.

*Analysis.*—Calculated: P, 11.49%; S, 11.35%. Found: P, 11.86%; S, 11.95%.

EXAMPLE 6

*Preparation of O,O-dimethyl-O-(1-methyl-2-n-butyl-sulfoxyl-ethenyl-1)-phosphate by Method A*

17 cc. of trimethylphosphite were rapidly added dropwise to 19.7 gm. of 1-n-butylsulfoxyl-1-chloro-propanone-2 at 90° C. while passing nitrogen therethrough. Thereafter, the reaction mixture was heated for six hours on a boiling water bath. Subsequently, the reaction mixture was worked up as described in Example 1. 21 gm. (77.7% of theory) of the compound of the formula shown in Example 5 were obtained.

*Analysis.*—P, 11.6%; S, 11.8%.

EXAMPLE 7

*Preparation of O,O-dimethyl-O-(1,2-dimethyl-2-ethyl-sulfoxyl-ethenyl-1)-phosphate by Method B*

24.0 gm. of O,O-dimethyl-O-(1,2-dimethyl-2-ethylmercapto-ethenyl-1)-phosphate were reacted with 11.3 gm. of aqueous 30% hydrogen peroxide as described in Example 2, and the reaction mixture was worked up. 23 gm. (90% of theory) of the compound of the formula

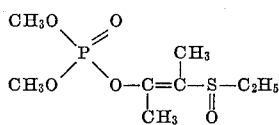

were obtained.

*Analysis.*—Calculated: P, 12.1%; S, 12.5%. Found: P, 11.95%; S, 12.6%.

EXAMPLE 8

*Preparation of O,O-diethyl-O-(1-n-propyl-2-methyl-sulfoxyl-ethenyl-1)-phosphate by Method B*

Using a procedure analogous to that described in Example 2, 26.8 gm. of O,O-diethyl-O-(1-n-propyl-2-methylmercapto-ethenyl-1)-phosphate were reacted with 11.3 gm. of aqueous 30% hydrogen peroxide, and the reaction mixture was worked up. 86% of theory of the phosphate of the formula

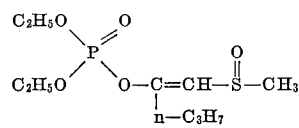

were obtained.

*Analysis.*—Calculated: P, 10.91%; S, 11.28%. Found: P, 10.85%; S, 11.35%.

EXAMPLE 9

*Preparation of O,O-dimethyl-O-(1-methyl-2-ethylsul-foxyl-2-chloro-ethenyl-1)-phosphate by Method B*

26.1 gm. of O,O-dimethyl-O-(1-methyl - 2 - ethylmercapto-2-chloro-ethenyl-1)-phosphate were reacted with 11.3 gm. of aqueous 30% hydrogen peroxide under the conditions described in Example 2, and the reaction mixture was worked up. 82% of theory of the phosphate of the formula

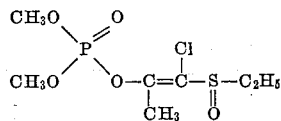

were obtained.

*Analysis.*—Calculated: P, 11.21%; S, 11.55%; Cl, 12.81%. Found: P, 11.41%; S, 11.67%; Cl, 12.63%.

The novel compounds according to the present application, that is, those embraced for Formula I above, have useful properties. More particularly, they are useful as highly effective and rapidly acting broad spectrum systemic insecticides and acaricides. They are effective as contact poisons as well as when ingested through the alimentary system. The compounds are especially effective against aphids, bedbugs, red spiders, house flies and mites. On the other hand, they exhibit no phytotoxicity and extremely low toxicity toward warm-blooded animals.

For insecticidal and acaricidal purposes the compounds of the present invention are used as the sole toxic agent in pesticidal formulations or in admixture with other toxicants for modification of the properties of the individual toxicants. For example, they may be used in admixture with toxaphene, DDT, Thanite, Chlordane, rotenone, pyrethrum and the like.

The compounds of this invention are water-soluble and are made into pesticidal compositions for use against insects and acarids by dissolution in a liquid insecticide adjuvant, such as water, as a carrier therefor, by dispersion in an organic solvent, or by dilution with a solid insecticide adjuvant as a carrier. Dispersions in organic solvents include dispersions in alcohols, pine oil, hydrocarbon solvents, difluorodichloromethane and similar organic solvents. The compounds of this invention may also be used in aerosol formulations in which difluorodichloromethane and similar aerosol propellants form the propellant vehicle. Thus, suitable compositions comprising one or more compounds of the present invention as active insecticidal and acaricidal agents are dusting powders, emulsions, suspensions, solutions, aerosols or ointments. The preferred concentration of active ingredient in such compositions is from 0.01 to 5% by weight, based on the total weight of the composition.

The following examples illustrate various insecticidal and acaricidal compositions comprising a compound of this invention as an active ingredient:

EXAMPLE 10

*Emulsion.*—40 gm. of O,O-dimethyl-O-(1-methyl-2-ethylsulfoxyl-ethenyl-1)-phosphate were admixed with 20 gm. of xylene and 40 gm. of sodium naphthalene sulfonate, and the resulting mixture was emulsified in an amount of water such that the concentration of the phosphate in the finished emulsion was 0.01% by weight.

Bean plants infested with aphids (*Aphis fabae*) and spider mites (*Tetramychus urticae*) were sprayed with the above emulsion, and a mortality count was made after 24 hours. A 100% kill was observed.

The same results were obtained when cyclohexanone was used as the organic solvent instead of xylene and the concentration of the phosphate in the finished aqueous emulsion was 0.05% by weight.

EXAMPLE 11

*Suspension.*—25 grams of O,O-diethyl-O-(1-methyl-2-methyl-sulfoxyl-ethenyl-1)-phosphate were sprayed onto 73 grams of kieselguhr, and 2 grams of sodium naphthalene sulfonate were added. The resulting mixture was milled until a homogeneous powder was obtained, and the powder was suspended in an amount of water such that the concentration of the phosphate in the finished suspension was 0.01% by weight.

Cut stem lima bean plants infested with *Aphis fabae* and *Tetramychus urticae* were placed into the above suspension, and a mortality count was made after 24 hours. A 100% kill was observed.

The same results were obtained when O,O-dimethyl-O - (1 - methyl - 2 - ethylsulfoxyl - ethenyl - 1) - phosphate was substituted for O,O-dimethyl-O-(1-methyl-2-methylsulfoxyl-ethenyl-1)-phosphate, and when the concentration of either of the phosphates in the suspension was 0.05% by weight.

EXAMPLE 12

*Dusting powder.*—2 gm. of O,O-dimethyl-O-(1-methyl-2-ethylsulfoxyl-ethenyl-1)-phosphate were admixed with 98 gm. of kaolin, and the resulting mixture was milled until a homogeneous powder was obtaind. The resulting dusting powder was highly effective as a contact insecticide against a variety of aphids and mites.

EXAMPLE 13

*Aerosol.*—5 parts by weight of O,O-diethyl-0-(1-methyl-2-methylsulfoxyl-ethenyl-1)-phosphate were dissolved in 95 parts by weight of difluorodichloromethane, and the resulting solution was filled in customary fashion into aerosol spray cans. The aerosol spray was a highly effective insecticide against the common housefly.

Although the above insecticide composition examples illustrate the use of only two specific compounds of the class of compounds embraced by Formula I as active ingredients, it should be understood that any of the other phosphates embraced by Formula I may be substituted for the illustrated species in these examples. Moreover, the concentration of the active insecticidal ingredient may be varied within the limits set forth above. Finally, the nature of the inert ingredients may be varied to meet particular requirements, and the compositions may in addition comprise other adjuvants customarily added to insecticidal compositions, such as adhesives or sticking agents.

While the present invention has been illustrated with the aid of certain specific embodiments thereof, it will be readily apparent to others skilled in the art that the invention is not limited to these embodiments and that various changes and modifications can be made without departing from the spirit of the invention or the scope of the appended claims.

We claim:

1. A compound of the formula $$\begin{array}{c} R_1O \\ \phantom{R_1O}\diagdown \\ \phantom{R_1O}\phantom{\diagdown}P \\ \phantom{R_1O}\diagup\phantom{P}\diagdown \\ R_2O \phantom{\diagup}\phantom{P}\phantom{\diagdown} O-C=C-S-R_3 \\ \phantom{R_2O\diagup P\diagdown O-}| \phantom{=}\| \\ \phantom{R_2O\diagup P\diagdown O-}R_4 \phantom{=}O \end{array}$$
with $R_5$ on the upper C.

wherein
  $R_1$ and $R_2$ are each selected from the group consisting of methyl and ethyl,
  $R_3$ is alkyl of 1 to 4 carbon atoms,
  $R_4$ is alkyl of 1 to 3 carbon atoms, and
  $R_5$ is selected from the group consisting of hydrogen, chlorine, methyl and ethyl.

2. O,O - dimethyl-O-(1-methyl-2-ethylsulfoxylethenyl-1)-phosphate.

3. O,O-dimethyl-O-(1-methyl-2-ethyl-2-methylsulfoxyl-ethenyl-1)-phosphate.

4. O,O-dimethyl-O-(1-methyl-2-n-butylsulfoxylethenyl-1)-phosphate.

5. O,O - dimethyl-O-(1,2-dimethyl-2-ethylsulfoxylethenyl-1)-phosphate.

6. O,O - diethyl-O-(1-n-propyl-2-methylsulfoxylethenyl-1)-phosphate.

7. O,O-dimethyl-O-(1-methyl-2-chloro-2-ethylsulfoxyl-ethenyl-1)-phosphate.

8. An insecticidal and acaricidal composition comprising a compound of claim 1 and an insecticide and acaricide adjuvant as a carrier therefor.

9. An insecticidal and acaricidal composition consisting essentially of an inert carrier and from 0.01 to 5% by weight, based on the total weight of the composition, of a compound of the formula $$\begin{array}{c} R_1O \\ \phantom{R_1O}\diagdown \\ \phantom{R_1O}\phantom{\diagdown}P \\ \phantom{R_1O}\diagup\phantom{P}\diagdown \\ R_2O \phantom{\diagup}\phantom{P}\phantom{\diagdown} O-C=C-S-R_3 \\ \phantom{R_2O\diagup P\diagdown O-}| \phantom{=}\| \\ \phantom{R_2O\diagup P\diagdown O-}R_4 \phantom{=}O \end{array}$$

wherein
  $R_1$ and $R_2$ are each selected from the group consisting of methyl and ethyl,
  $R_3$ is alkyl of 1 to 4 carbon atoms, and
  $R_4$ is alkyl of 1 to 3 carbon atoms, and $R_5$ is selected from the group consisting of hydrogen, chlorine, methyl and ethyl.

10. The method of killing insects and acarids which comprises contacting said insects and acarids with a compound of the formula

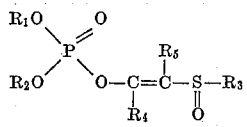

wherein
$R_1$ and $R_2$ are each selected from the group consisting of methyl and ethyl,
$R_3$ is alkyl of 1 to 4 carbon atoms,
$R_4$ is alkyl of 1 to 3 carbon atoms, and
$R_5$ is selected from the group consisting of hydrogen, chlorine, methyl and ethyl.

No references cited.

JULIAN S. LEVITT, *Primary Examiner*.